United States Patent
Maskatiya et al.

(10) Patent No.: US 6,758,394 B2
(45) Date of Patent: Jul. 6, 2004

(54) IDENTITY VERIFICATION AND ENROLLMENT SYSTEM FOR SELF-SERVICE DEVICES

(75) Inventors: Vali Maskatiya, Atherton, CA (US); Safwan Shah, San Jose, CA (US); Ashim Banerjee, Westminster, CO (US)

(73) Assignee: Infonox on the Web, Santa Clara, CA (US)

(*) Notice: Subject to any disclaimer, the term of this patent is extended or adjusted under 35 U.S.C. 154(b) by 0 days.

(21) Appl. No.: 09/902,074

(22) Filed: Jul. 9, 2001

(65) Prior Publication Data

US 2003/0006277 A1 Jan. 9, 2003

(51) Int. Cl.[7] .............................................. G06F 17/60
(52) U.S. Cl. ........................ 235/379; 235/380; 705/44; 382/115; 340/5.82
(58) Field of Search .............................. 713/202; 902/1, 902/3, 4, 5; 235/379, 380, 381, 382, 382.5; 705/66, 67, 18, 44; 382/115, 116, 117, 118, 119, 124; 340/5.52, 5.53, 5.8, 5.81, 5.82, 5.83, 5.84; 348/156

(56) References Cited

U.S. PATENT DOCUMENTS

| | | | |
|---|---|---|---|
| 4,308,522 A | 12/1981 | Paganini et al. | 340/146.3 SY |
| 4,993,068 A | 2/1991 | Piosenka et al. | 380/23 |
| 5,341,428 A | 8/1994 | Schatz | 380/23 |
| 5,432,864 A | 7/1995 | Lu et al. | 382/118 |
| 5,550,359 A * | 8/1996 | Bennett | 235/382 |
| 5,592,377 A | 1/1997 | Lipkin | 395/242 |
| 5,598,474 A | 1/1997 | Johnson | 380/23 |
| 5,642,160 A * | 6/1997 | Bennett | 348/156 |
| 5,748,737 A | 5/1998 | Daggar | 380/24 |
| 5,787,186 A * | 7/1998 | Schroeder | 382/115 |
| 5,793,811 A | 8/1998 | Yu | 375/247 |
| 5,870,723 A | 2/1999 | Pare, Jr. et al. | 705/39 |
| 5,892,838 A * | 4/1999 | Brady | 382/115 |
| 5,984,366 A | 11/1999 | Priddy | 283/72 |
| 6,038,553 A | 3/2000 | Hyde, Jr. | 705/45 |
| 6,045,039 A | 4/2000 | Stinson et al. | 235/379 |
| 6,072,894 A | 6/2000 | Payne | 382/118 |
| 6,109,524 A * | 8/2000 | Kanoh et al. | 235/381 |
| 6,119,096 A | 9/2000 | Mann et al. | 705/5 |
| 6,145,738 A | 11/2000 | Stinson et al. | 235/379 |
| 6,149,056 A | 11/2000 | Stinson et al. | 235/379 |

(List continued on next page.)

FOREIGN PATENT DOCUMENTS

JP          9-245231 A   *   9/1997

*Primary Examiner*—Jared J. Fureman
(74) *Attorney, Agent, or Firm*—Townsend and Townsend and Crew LLP

(57) ABSTRACT

A method and system are provided for authorizing a customer to perform transactions with a self-service device. A first set of biometric data regarding the customer is extracted from a verification instrument. A second set of biometric data is extracted directly from at least one feature of the customer. Textual data regarding the customer is extracted from the verification instrument. The first and second sets of biometric data are compared to determine whether they are derived from a single individual. If so, customer identification information is recorded.

39 Claims, 5 Drawing Sheets

U.S. PATENT DOCUMENTS

| | | | |
|---|---|---|---|
| 6,154,879 A | 11/2000 | Pare, Jr. et al. | 902/3 |
| 6,182,221 B1 | 1/2001 | Hsu et al. | 713/186 |
| 6,192,142 B1 | 2/2001 | Pare, Jr. et al. | 382/115 |
| 6,202,151 B1 | 3/2001 | Musgrave et al. | 713/186 |
| 6,205,233 B1 | 3/2001 | Morley et al. | 382/103 |
| 6,212,290 B1 | 4/2001 | Gagne et al. | 382/125 |
| 6,230,148 B1 | 5/2001 | Pare, Jr. et al. | 705/40 |
| 6,243,689 B1 | 6/2001 | Norton | 705/18 |
| 6,246,769 B1 | 6/2001 | Kohut | 380/45 |
| 6,341,169 B1 * | 1/2002 | Cadorette, Jr. et al. | 382/115 |
| 6,575,362 B1 * | 6/2003 | Bator et al. | 235/381 |
| 2002/0091937 A1 * | 7/2002 | Oritz | 713/200 |
| 2002/0148892 A1 * | 10/2002 | Bardwell | 235/380 |
| 2003/0046096 A1 * | 3/2003 | Shah et al. | 705/1 |
| 2003/0061172 A1 * | 3/2003 | Robinson | 705/67 |
| 2003/0159052 A1 * | 8/2003 | Lee et al. | 713/186 |
| 2004/0003295 A1 * | 1/2004 | Elderfield et al. | 713/202 |
| 2004/0032975 A1 * | 2/2004 | Boccacci | 382/115 |

\* cited by examiner

IDENTITY VERIFICATION AND ENROLLMENT SYSTEM FOR SELF-SERVICE DEVICES

BACKGROUND OF THE INVENTION

The present invention relates generally to self-service devices. More particularly, the invention relates to an identity verification and enrollment system for self-service devices.

In recent years, there has been an increase in the types of services that may be offered by self-service devices, which may be used by a customer to perform a transaction without direct interaction with a human. A common example of such self-service devices within the financial sector is the automatic teller machine ("ATM"), which provides a customer with the ability to perform transactions with his bank. Typical services that may be provided include the ability to deposit or withdraw funds from one or more accounts held with the bank, or the ability to transfer funds among those accounts. Some institutions provide a broader range of services, such as the ability to cash a check at a self-service device. While marketed as "check cashing" systems, such systems are, in reality, little more than common "cash withdrawal" systems because checks are generally cashed only for persons who hold an account with that institution. When the check is cashed, the amount of the check, in addition to any applicable service fee, is deducted from the depositor's account.

More recently, developments have been made to establish true check-cashing self-service systems that do not rely on the direct support of the customer's account. One such effort in that direction is described generally in U.S. Pat. No. 6,145,738, assigned to Mr. Payroll Corporation ("the '738 patent"), the entire disclosure of which is herein incorporated by reference for all purposes. A particular disadvantage with the system described in that patent, however, is related to the need to verify the identity of a customer, particularly during the initial enrollment with the system. After the initial enrollment of the customer, the system of the '738 patent may use biometric data based, for example, on an image of the customer or the customer's fingerprint, to identify the customer. Check-cashing functions are then extended to the customer when his identity has been established by comparing his biometric data with what has been stored on the system.

While this system is effective after enrollment has been established, the problem of initial enrollment still persists. In particular, the system lacks the capability of determining whether the customer, the first time he presents himself, is indeed the person he claims to be. As implemented, enrollment is a particularly tiresome process that requires a new customer to be in telephonic contact with a call-center person and to answer several questions to verify his identity. This process can, typically, take up to ten minutes, and has a very significant negative impact on customer experience. Another example of a check-cashing self-service system that suffers from similar deficiencies is described in U.S. Pat. No. 5,592,377, the entire disclosure of which is herein incorporated by reference for all purposes.

There thus exists a general need in the art for an effective automatic method of enrolling an individual for approval in performing transactions with a self-service device.

BRIEF SUMMARY OF THE INVENTION

Embodiments of the invention thus include a method and system for authorizing a customer to perform transactions with a self-service device. In one embodiment, a first set of biometric data regarding the customer is extracted from a verification instrument. A second set of biometric data is extracted directly from at least one feature of the customer. Textual data regarding the customer is extracted from the verification instrument. The first and second sets of biometric data are compared to determine whether they are derived from a single individual. If so, customer identification information, which may be derived from the extracted textual data, is recorded.

The customer identification information may comprise a name of the customer. The transactions may comprise providing funds in exchange for a financial instrument identifying the name of the customer, such as a note, a draft, a check, or a promissory note. The customer identification information may also comprise a signature of the customer. In one embodiment, the customer identification information is further derived from one of the first and second sets of biometric data.

In different embodiments, the first set of biometric data may be derived from image data on the verification instrument, from data encoded magnetically on the verification instrument, or from data encoded optically on the verification instrument. Examples of biometric data that may be used to derive the biometric data sets include facial features, fingerprints, and voice features. The textual data may be derived, for example, from data encoded magnetically or optically on the verification instrument. Alternatively, a database reference number may be extracted from the verification instrument and the textual data retrieved from the database with the database reference number.

The methods of the invention may be embodied in a self-service transaction system. The system comprises a plurality of networked self-service devices. At least one of the devices includes two identification devices. The first identification device is adapted to extract a first set of identification data directly from a customer and the second identification device is adapted to extract a second set of identification data and textual data regarding the customer from a verification instrument. A comparator in communication with the self-service device is configured to compare the first and second sets of identification data to determine whether they are derived from a single individual. A storage device is provided for storing customer identification data derived from the textual data.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and is followed by a hyphen to denote one of multiple similar components. When reference is made to a reference numeral without specification to an existing sublabel, it is intended to refer to all such multiple similar components.

DETAILED DESCRIPTION OF THE INVENTION

1. Introduction

The problem of accurate, automatic initial enrollment is a significant barrier preventing the use self-service devices from reaching their full potential. This is particularly so because past approaches have tended to make the enrollment process either perpetual, essentially requiring a new enrollment for every transaction, or prolonged, as the result of human intervention to verify the identity of the enrollee. As a result of this problem, it has been difficult for the use of self-service devices to reach their full potential, particularly with respect to the so-called "underbanked" or "self-banked" population, i.e. those individuals who have no access to bank accounts. By some estimates, the size of the underbanked population in the United States alone is as large as 50,000,000 people.

Embodiments of the invention may therefore be adapted for performing transactions with self-service devices. As used herein, "transaction" is intended to be understood broadly as referring to any act taken between two or more parties. As described below, embodiments of the invention are particularly suitable for transactions that are performed with a "self-service device," which refers broadly to any system that allows a human to participate in a transaction without being in physical contact with another human. Examples of self-service devices include ATM's, kiosks, personal computers, personal digital assistants, etc. Certain transactions with self-service devices use "enrollment," which refers broadly to any process used to verify the identity of the human participant, and sometimes includes recording verification information to aid in future identification of the human participant.

It will thus be appreciated that embodiments of the invention may be adapted to a variety of applications that may use enrollment with self-service devices. Particular examples set forth below relate to financial systems, although embodiments find applications for any transaction system, further examples of which include: check-in procedures, such as with airlines; voting transactions; contest enrollment, etc. Aspects of the invention may thus readily by adapted for use with existing self-service financial or other systems. The structure and operation of an exemplary such system that acts as a self-service check-cashing device is provided in the '738 patent, which has been incorporated by reference. The methods of the invention may be embodied in the form of computer-readable programs for directing operation of the self-service devices, and may find general applicability in any appropriate processing environment. The methods may be implemented with any suitable hardware and software combination, but usually will include a processor, a storage medium, an input device, and an output device. The programs will usually be implemented in a high-level procedural or object-oriented language, but may alternatively be implemented in assembly or machine language.

2. System Overview

Figure 1:
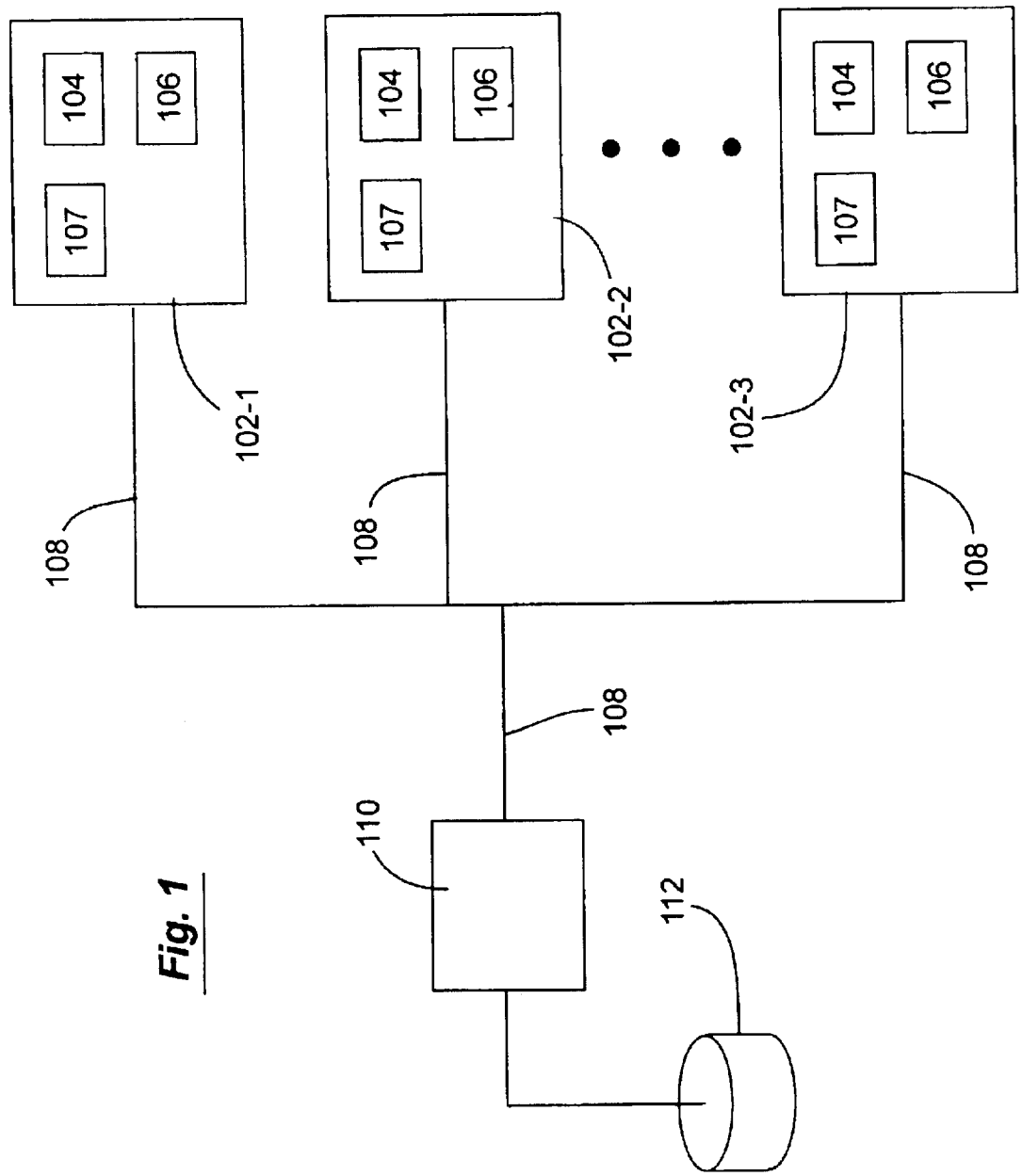
FIG. 1 is a schematic diagram illustrating the interconnection of various components of a system that uses embodiments of the invention.

An overview of one embodiment of the invention is shown schematically in FIG. 1. In this embodiment, a plurality of self-service devices 102 are provided at remote locations for use by customers, such as in the form of kiosks. The self-service devices 102 may be configured generally for use in a variety of different contexts. For example, in one embodiment, the self-service devices are adapted to provide financial services, such as for cashing financial instruments. Such financial instruments may include, for example, instruments that identify a payee, such as checks, drafts, and promissory notes, or may include instruments that are not restricted to a particular payee, such as bearer paper. In other embodiments, the self-service devices may be configured to perform other types of transactions, such as check-in kiosks affiliated with airlines at an airport to check-in passengers without having to see an airline representative.

Each of the kiosks includes a verification-instrument module 104 adapted for extracting image or biometric data, and perhaps also textual data as described below. Typically, the module 104 is configured to analyze a particular type of verification instrument, which includes an image amenable to biometric analysis. As used herein, "biometric" data includes any data derived directly from a biological feature of an individual. "Image data" refers to any optically derived data, which may in some instances also be biometric data. For example, the verification instrument may be a driver's license or passport, each of which includes a photograph of the customer that may be compared with a direct image of the customer by performing a suitable biometric analysis. Alternatively, the verification instrument may be a resident-alien card or other instrument that includes a fingerprint of the customer that may be compared with a direct image or biometric analysis of the fingerprint. The scope of the invention extends to other types of biometric data that may conceivably be encoded on verification instruments, such as voice patterns, retinal scans, or genetic data. One particular biometric technique that may be used with the invention is described in U.S. Pat. No. 5,710,833, issued to Moghaddam et al. on Jan. 28, 1998, and which is herein incorporated by reference in its entirety for all purposes. The method described there uses a plurality of eigenvectors derived from facial features for comparison and subsequent recognition.

As explained below, in some embodiments the verification instrument also includes textual data in some form that is used to identify the customer further. This textual data may be used to increase the reliability that the person enrolled is indeed the individual identified with the verification instrument. As used herein, "textual data" is intended to be interpreted broadly and refers to any data that is not biometric data.

Where the kiosks are provided for the execution of financial transactions, each of the self-service devices 102 also includes an financial-instrument module 106. The financial-instrument module 106 is configured for analysis of the financial instrument, be it a check, draft, promissory note, or other instrument, that the customer wishes to exchange for cash or its equivalent. As explained in greater detail below, the financial-instrument module 106 is adapted for analysis of the instrument so that a decision can be made whether to complete the financial transaction desired by the customer.

Each of the self-service devices 102 additionally includes a mechanism 107 adapted to collect biometric or image data directly from the customer that may be used in comparison with biometric or image data extracted from the verification instrument. For example, where the verification-instrument module 104 is configured to extract data from a photograph, the mechanism 107 may be a camera adapted for photographing the customer directly. Where the verification-instrument module 104 is configured to extract fingerprint data, the mechanism 107 may be a camera adapted for imaging features of the customer's fingerprint directly.

Other types of biometric or image data that may be encoded on the verification instrument may similarly be extracted with a suitable mechanism 107. Once the data are collected directly from the customer and from the verification instrument, they are compared. In some embodiments, such comparison may be performed automatically, particularly in the case of biometric data. In other embodiments, including some of those where image data are collected, the comparison may be performed by human, who may be located remotely from the self-service device, by providing images of the image data (for example, on a monitor) directly to the human.

Each of the remote self-service devices 102 is configured for communication with a central station 110 through communication lines 108. In one embodiment, the communication is maintained essentially continuously so that data may be exchanged with the central station 110 at any time. In other embodiments, communication exists intermittently; in some such embodiments, data may be stored locally at the self-service devices and exchanged with the central station when the communication link is active. In some embodiments the communication lines 108 comprise electrical or optical connections. In alternative embodiments, communication between the self-service devices 102 and the central station 110 is achieved through the transmission of electromagnetic signals.

Data at the central station 110 is stored on a storage device 112. Thus, for example, for all previously enrolled customers, certain biometric or image data as described below may reside on the storage device 112 and be available for comparison. When a particular enrolled customer wishes to perform a transaction at one of the self-service devices, he will be asked to provide corresponding biometric or image data to the mechanism 107 for comparison purposes. The biometric or image data extracted by the mechanism 107 will be compared with the stored biometric or image data by accessing a copy of the stored data through the communication lines 108 and, if a predetermined level of confidence is reached that the comparison establishes that the two data sets describe the same individual, the customer's transaction will be approved. As for the initial enrollment, such comparison may be performed automatically or by a human. In embodiments where a human comparison is performed, the human may be located at the central station 110 and be provided with image representations of the data, such as on a monitor.

3. Operation of the Self-Service Devices

Figure 2A:
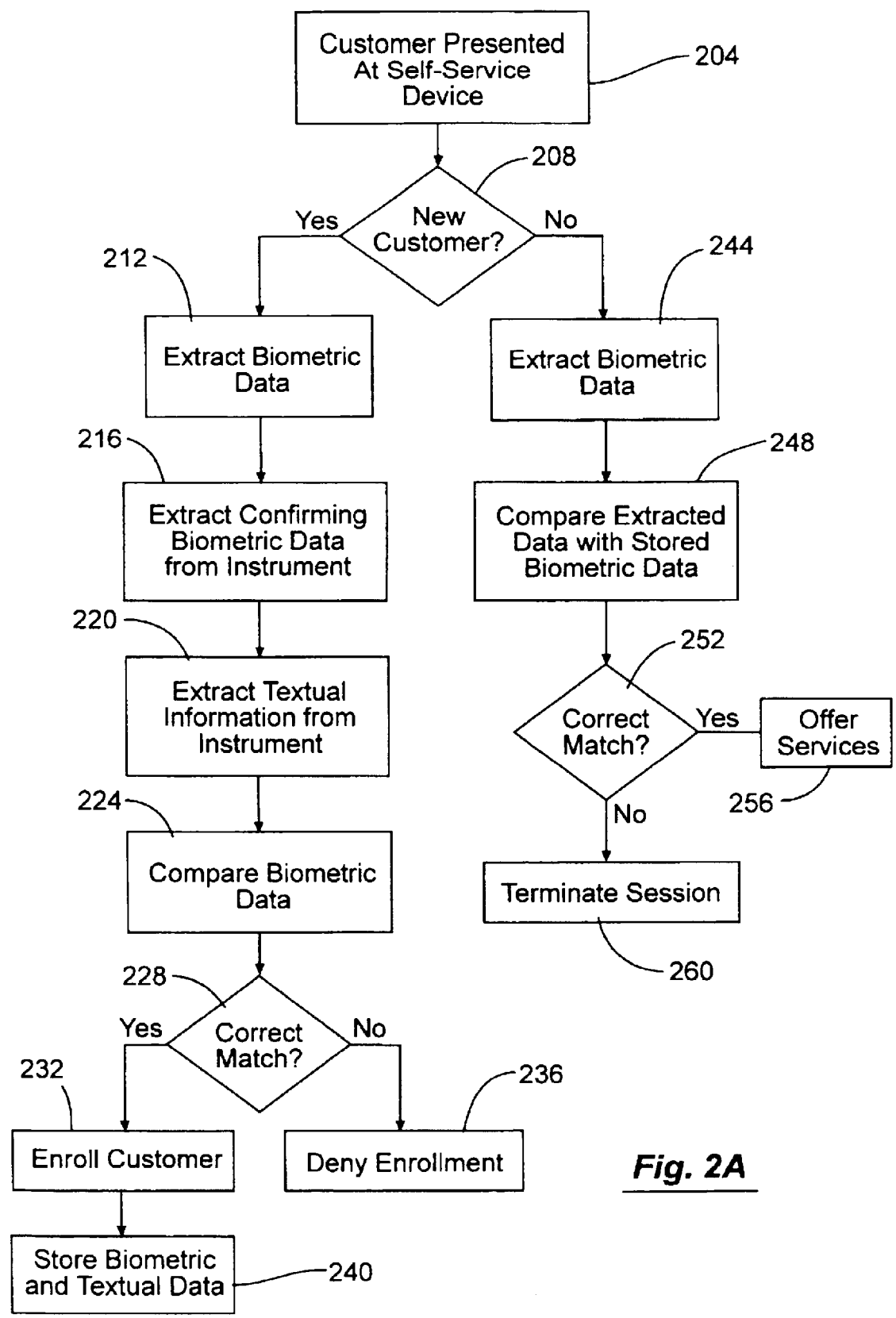
FIG. 2A is a flow diagram illustrating the functioning of the system in one embodiment.

FIG. 2A illustrates the operation of the system in detail. At block 204, the customer presents herself at the self-service device 102. An initial determination is made at block 208 whether the customer is a new or existing customer. This determination may be conducted in a variety of ways, such as by asking the customer to identify whether she is a new or existing customer. Alternatively, the system may ask the customer to identify herself, and will compare the identification with a list of existing customers that may also be stored on the storage device 112. If it is determined that the customer is a new customer, the left side of the flow diagram is followed, and if it determined that the customer is an existing customer, the right side of the flow diagram is followed.

In the embodiment illustrated in FIG. 2A, for a new customer, current biometric data is extracted with the mechanism 107 at block 212, by imaging and analyzing the customer's face, fingerprint, or otherwise. At block 216, the new customer is directed to provide a verification instrument that includes features that may be used for comparison with the data derived from the mechanism's 107 measurement. In some embodiments, the self-service device 102 may be adapted for use with multiple types of biometric data. In such embodiments, the customer may be given a choice of which biometric data to use for the initial enrollment and also for future transactions; alternatively, a plurality of biometric measures may be used so that future transactions may be approved on the basis of any one of those biometric measures. The biometric data is extracted from the verification instrument by directing the new customer to submit the verification instrument to the verification-instrument module 104, which is shown and described in greater detail with respect to FIG. 4A.

At block 220, textual information is extracted from the instrument. How the textual information is extracted may depend on how it is provided on the instrument, and is described in greater detail with respect to FIG. 3 below. At block 224, the two sets of biometric data, i.e. provided by the direct measurement of the mechanism 107 and provided by the verification instrument, are compared. For example, in the instance where the biometric technique described in the '833 patent is used, sets of eigenvectors are derived both from scanning the customer's face optically and from scanning the photograph of the customer on the verification instrument. The similarity of these resulting eigenvectors indicates the likelihood that the person in the photograph and the customer who has presented herself are the same.

An evaluation is made at block 228 whether the two biometric measures match to the required degree, for example at the 98% or 95% confidence level. If the match is adequate, the customer is enrolled at block 232 and both biometric and textual data are stored in the storage device 112 at block 240. In one embodiment, the stored biometric data corresponds to that taken by the mechanism 107 while in another embodiment, the stored biometric data corresponds to that taken from the verification instrument. If the match is not adequate, enrollment of the customer is denied at block 236 on the basis that the customer lacks sufficient verification credentials to complete the enrollment.

While the left side of FIG. 2A illustrates the basic operation of one embodiment of enrollment aspects of the system, there are numerous alternative and equivalent embodiments, some of which are now described. For example, in one alternative embodiment, the system is configured to notify a human operator that the match was inadequate; the human operator may intervene and examine images of the biometric scans to determine whether there is sufficient basis to overrule the automatic comparison. Such overruling may be appropriate, for example, where it is clear to the human operator that the match was inadequate as a result of aging or a weight change in the customer. In further alternative embodiments, the comparison of biometric measures may instead be substituted with image analysis and pattern recognition. For example, the system may be configured at blocks 212 and 216 to extract image data respectively from the customer directly and from the verification instrument. Rather than apply biometric analysis on the two sets of image data, they are compared with pattern-recognition functions to determine whether they are equivalent to the required degree.

In another alternative embodiment of the invention, the possibility is provided for a human comparison of the two sets of image data in the event that the automatic system determines that they are not sufficiently similar to permit enrollment. In such an embodiment, the customer may be given the option of requesting a human comparison instead of having the system summarily deny enrollment. The two sets of image data are thus transmitted to the central station 110 over communication lines 108 where they are displayed in a form suitable for comparison by a human operator. If the operator judges the comparison to be adequate, he has the discretion to overrule the automatic system and to permit enrollment.

Figure 2B:
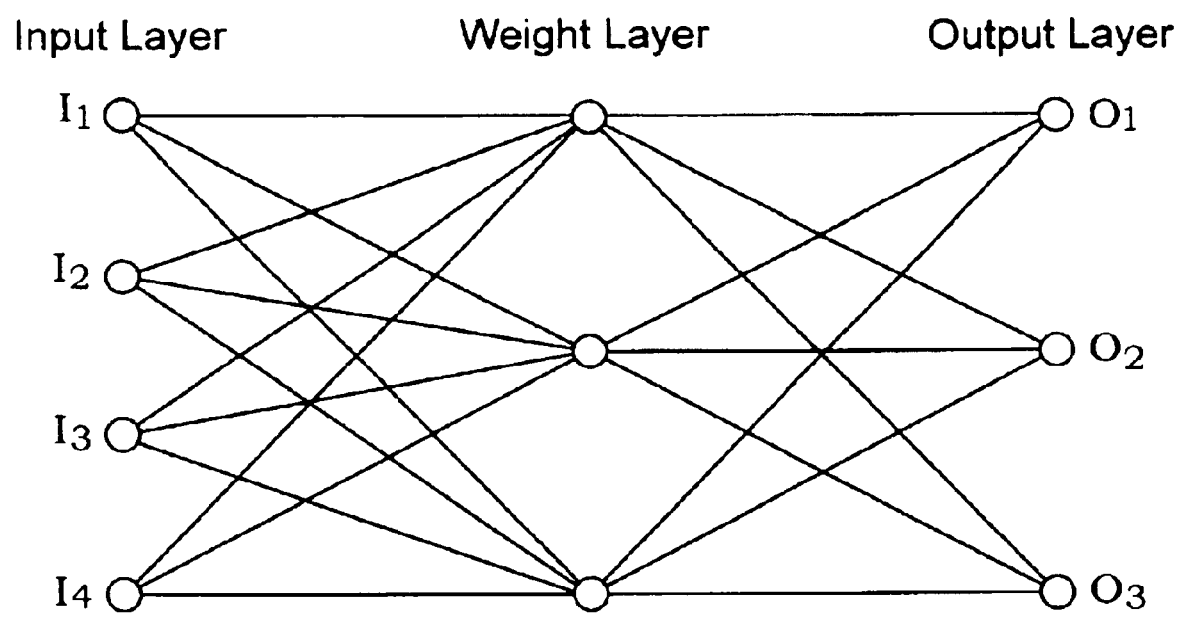
FIG. 2B is a schematic diagram of a neural network.

The ability of the operator to overrule the automatic system lends itself very naturally to a method of performing the pattern recognition that may take account of training feedback. One such system is a neural network. A typical neural network includes a plurality of nodes, each of which has a weight value associated with it. A simplified example is shown in FIG. 2B. The network includes an input layer having a plurality of input nodes, each of which has a weight value associated with it. The network includes an input layer having a plurality of input nodes $I_x$ and an output layer having a plurality of output nodes $O_y$, with at least one layer there between. In the simplified example shown in FIG. 2B, there are four input nodes $I_1$–$I_4$ and three output nodes $O_1$–$O_3$. The activity of the input nodes $I_x$ represents the raw information that is fed into the network and the behavior of the output nodes $O_y$ represents the interpretation drawn by the network. The intermediate layer acts as a weight layer to assign relative weights to the different inputs from the input nodes $I_x$. As the system receives feedback from the operator when an incorrect decision is made on the basis of the presented image data, the neural network may reorganize itself to reach the correct decision with the same input. Thus, in such an embodiment, the system is adaptive.

In still further embodiments, a human comparison of the two sets of image data is performed routinely at block 224 rather than having any comparison performed by an automatic system. In such an embodiment, a human operator is stationed where he can observe the two sets of image data after they are transmitted to the central station 110 over communication lines 108. They are then displayed, such as on a monitor, so that they may be compared by the human operator directly. In such embodiments, at least one of the sets of image data is still stored at block 240 if enrollment is approved by the operator, so that such stored image data may be retrieved for comparison in connection with subsequent transactions.

Regardless of whether the system compares biometric measures derived from biometric data or compares image data through pattern-recognition techniques, the system may be further enhanced at block 224 to compare against a Deny Enrollment List. Such a Deny Enrollment List may include biometric or image data corresponding to individuals for whom it has previously been determined that enrollment should be denied irrespective of the quality of the verification instrument they present and its ability to support their identification. Such individuals may include, for example, those with a history of delinquency with the organization that operates the enrollment system. Image or biometric data included in the Deny Enrollment List may also be supplied by law-enforcement agencies, for example, such as in the form of photographs or fingerprints.

Enrollment of the customer at block 232 includes acquiring relevant personal information, such as name, address, and telephone number, as well as relevant financial information, such as income level, bank-account numbers, etc. In one embodiment, the customer is not queried for any of such information that is provided in the form of the extracted textual information. Instead, the information stored on the storage device 112 to identify the newly enrolled customer is restricted to that information available on the verification instrument. It will be appreciated that an advantage to such embodiments that use this extracted textual information is that the person enrolled must be the person identified by the verification instrument. This decreases the chances of fraudulent enrollments, which may be particularly decreased where the biometric or image data extracted from the verification instrument is itself also stored on the storage device. In such instances, any individual subsequently attempting to access the services at the self-service device will always be compared with the verification-instrument data.

The right side of the flow diagram now applies to the newly enrolled customer whenever she seeks to perform a subsequent transaction with any of the self-service devices 102. It is possible to perform transactions with other self-service devices because of their networked structure with the central station 110 and storage device 112. When the system determines at block 208 that the customer is an already enrolled customer, it again extracts biometric data directly at block 244 with the mechanism 107. At block 248, this biometric data is compared with the biometric data stored on the storage device 112. Thus, a comparison is effectively being made between the newly extracted biometric information and one of (1) a comparable extraction performed when the customer first enrolled and (2) biometric data from the verification article that was previously judged to be an acceptable match to the customer.

At block 252, a similar comparison is then made between the stored biometric data, which is recovered through communication lines 108 from the central station 110, and the newly extracted biometric data. If the match between the two is acceptable, usually at the same confidence level required for the initial enrollment, services will be offered to the customer at block 256. If, instead, the match is unacceptable, the session will be terminated at block 260.

As was the case for the left side of FIG. 2A, there are a number of alternative and equivalent embodiments that fall within the scope of the invention. For example, at blocks 244 and 248, biometric data may be substituted with image data that is extracted and compared with stored data. The comparison at block 252 may be performed automatically by the system, with either the biometric or image data, or may be performed by a human operator who is presented with image representations of the data, such as on a monitor at the central station 110. In other alternative embodiments, intervention of a human operator may instead be possible if the comparison is performed automatically at block 252, but found to be unacceptable, with the human operator comparing the new biometric or image data with the stored biometric or image data to account for changes that may be the result of aging, weight change, or other physical change. In a particular embodiment, this feedback information may then be fed to a neural network as described above, or other trained evaluation system, so that it may self-adapt and correct its behavior.

In offering services at block 256, the system may apply established criteria for approving or denying specific transactions. In the case of financial transactions, such criteria may be derived, for example, from the customer's financial and personal information, her credit history, and any past interaction she may have had with the system. In some embodiments, the processing of specific transactions may be active, as described in detail in the copending commonly assigned U.S. patent application Ser. No. 09/871,996, filed May 31, 2001 by Safwan Shah et al. and entitled "ACTIVE TRANSACTION GENERATION, PROCESSING, AND ROUTING SYSTEM," the entire disclosure of which is herein incorporated by reference for all purposes.

For example, the system may use a neural network that resides at the central station 110 to determine what action to take in response to a particular transaction request. As mentioned above, a simple neural network is shown schematically in FIG. 2B. In order to train such a neural network, connections and weights are assigned randomly and output values are calculated for sample input values. The output values are compared against the correct interpretation as it would be made by a human with some known samples. If the output value is incorrect when compared against such a test interpretation, the neural net modifies itself to arrive at the correct output value. This is achieved by connecting or disconnecting certain nodes and/or adjusting the weight values of the nodes during the training through a plurality of iterations. Once the training is completed, the resulting layer/node configuration and corresponding weights represents a trained neural net. The trained neural net is then ready to receive unknown data and develop interpretations for generating, processing, and routing transactions in an adaptive fashion. Classical neural nets include Kohonen nets, feed-forward nets, and back-propagation nets. These different neural nets have different methods of adjusting the weights and organizing the respective neural net during the training process. In alternative embodiments, the system may simply use a set of fixed rules to determine whether to approve or deny the specific transaction. Such rules will generally be related to the size of the transaction desired and available indicia of the customer's ability to support it, such as salary, bank-account balance, credit history, etc.

It will be appreciated that a number of advantages ensue from the structure of the system as outlined with respect to FIG. 2A. For example, it is necessary to go through the more inconvenient process of providing a verification instrument to be examined only a single time. It is not necessary to provide the verification instrument each time a customer wishes to perform a transaction with one of the networked self-service devices. Also, the enrollment process itself is highly efficient since verification of the customer's identity is automated. In those embodiments where textual information is extracted from the verification instrument and used as personal enrollment information, the enrollment process is even more efficient.

Figure 3:
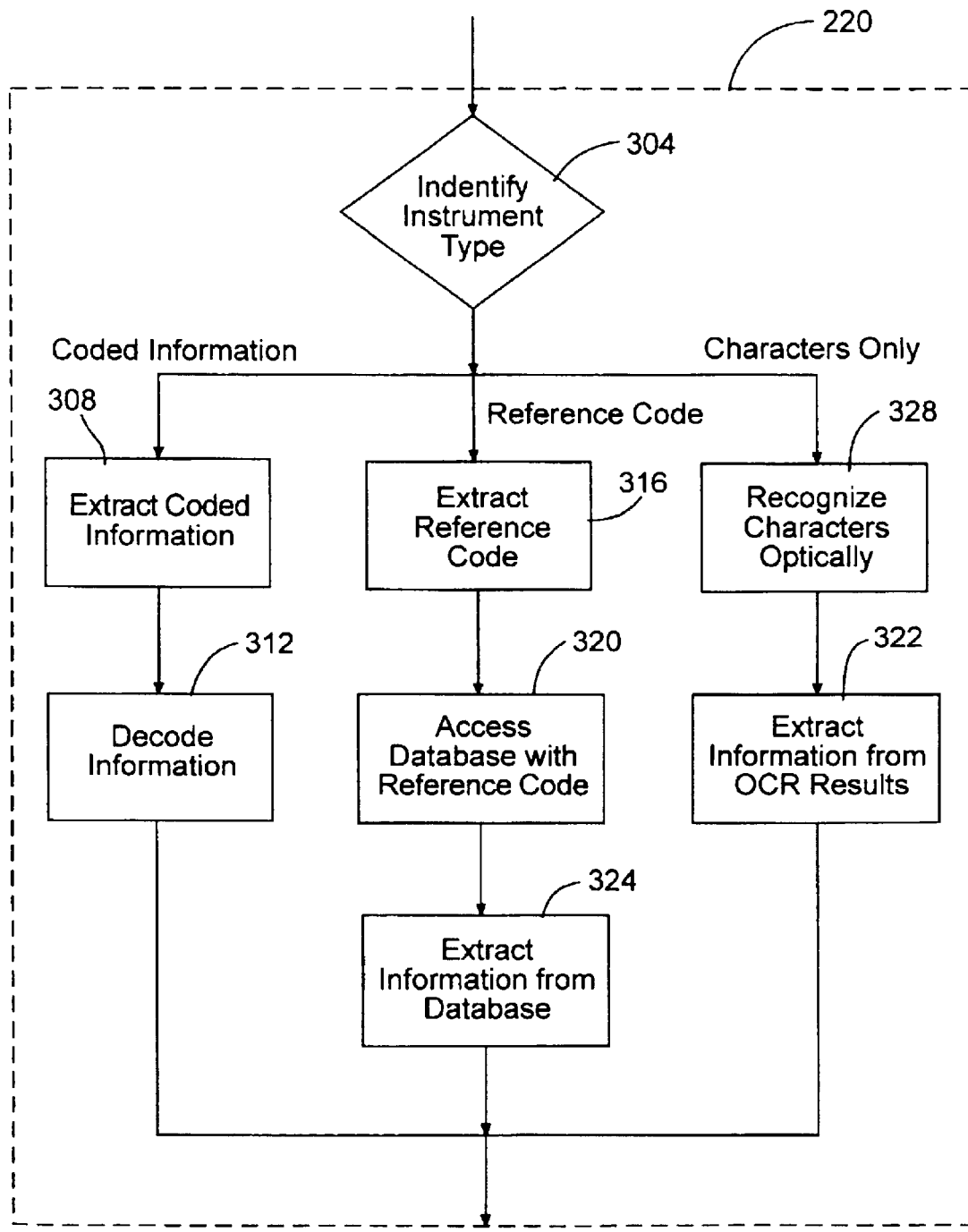
FIG. 3 is a flow diagram illustrating the textual-data extraction feature in detail.

FIG. 3 shows a detail of block 220 to illustrate different ways in which textual data may be extracted from the verification instrument depending on how such textual information is provided. The variety in driver's licenses provided within the United States serves as an illustrative example, although it will be understood that this example is described in detail for explanatory purposes and is not intended to be limiting; similar types of textual information are provided on other U.S. and non-U.S. verification instruments. Every U.S. driver's license contains some degree of personal information describing the individual, such as name, address, sex, Social Security number, etc. In some states, a common linear bar code is provided on the rear of the license and provides a number that refers to a government database entry, the database entry including at least the personal information that appears on the license. Linear bar codes are typically configured so that binary-coded decimal information is provided in a pattern of alternating light and dark stripes. In other states, such a reference number is encoded on a magnetic stripe and may be extracted by swiping the card through a magnetic reader. In still other states, no such coded information appears on the driver's license, with the information being presented only in standard human-readable textual form.

It is also possible in some embodiments for the personal information to be encoded directly in a non-human-readable format. For example, where the amount of personal information is not particularly extensive, a magnetic stripe may be sufficient to store all the encoded information directly. A further example of an encoding that stores all of the personal information directly is in the form of a two-dimensional bar-type code; the extra dimension beyond a simple linear bar code permits considerably greater amounts of information to be encoded. An example of a two-dimensional code and suitable optical code reader configured for extracting the information is described, for example, in U.S. Pat. No. 6,181,836, issued to Tetsuya Kannon on Jan. 30, 2001, the entire disclosure of which is herein incorporated by reference for all purposes.

The organization illustrated in FIG. 3 contemplates that the system may be presented with a verification instrument configured in at least any of these ways. Thus, at block 304 the system identifies what type of instrument has been presented, at least with respect to whether any coded information appears on the instrument that may be used to extract the textual data. This may be done directly, by having the system examine the front and/or back of the instrument, or by querying the customer to identify what state issued her driver's license, from which the structure of the instrument will be known. If the information is coded directly on the instrument, such as in the form of a two-dimensional bar-type code or in the form of a magnetic stripe, the system follows the left prong of the flow diagram. At block 308, it extracts the coded information from the instrument, such as by having the customer swipe the instrument through a magnetic reader or by using the device described in U.S. Pat. No. 6,181,836 depending on how the information is encoded. At block 312, the system decodes the extracted information for use as textual data in accordance with embodiments of the invention.

If the instrument contains a reference code, such as may be the case with a linear bar code or magnetic stripe configured only to reference a government database entry, the system follows the central prong of the flow diagram. At block 316, the reference code is extracted by decoding it. Depending on how the reference code is stored, this may be done by having the customer swipe the instrument through a magnetic reader or by examining the bar code optically such as is routinely done for bar-code information in a variety of contexts. At block 320, the relevant government database is accessed, with the decoded reference code being used to access the particular database entry of interest. Information is then extracted directly from that database entry at block 324. In some embodiments, the customer may be prompted to enter data, such as a Social Security Number, that may be compared with the data retrieved from the government database; this adds an additional level of verification to confirm the identity of the customer.

If the system is unable to identify any coded information of any such types on the instrument, the right prong of the flow diagram is followed. On this prong, the system relies on some form of character recognition to extract the desired textual data directly from the printed instrument. In one embodiment, optical character recognition is used at block 328 to identify the characters on the instrument, from which the textual information is extracted directly at block 322.

4. Exemplary Application: Financial Services

Figure 4A:
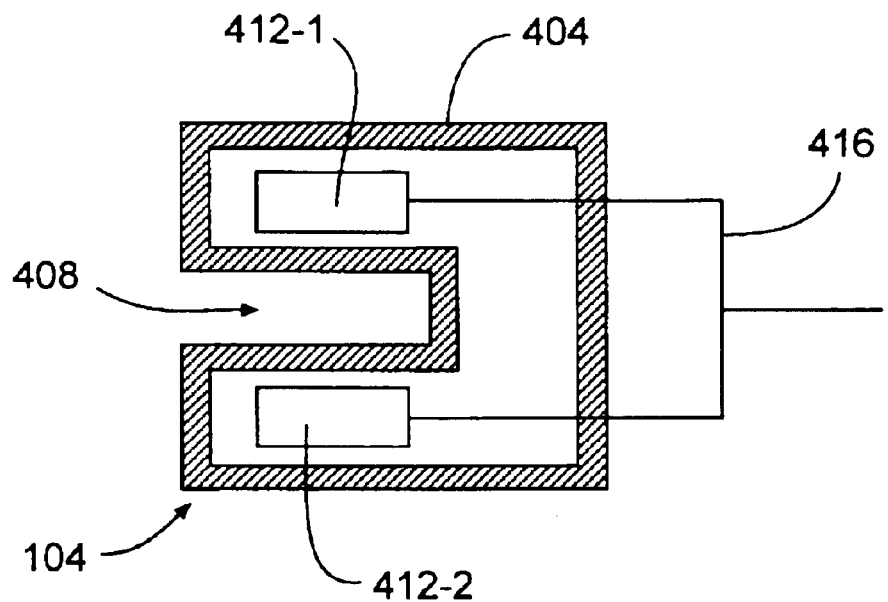
FIGS. 4A and 4B are schematic diagrams showing aspects of the invention as applied to financial transactions in greater detail.
Figure 4B:
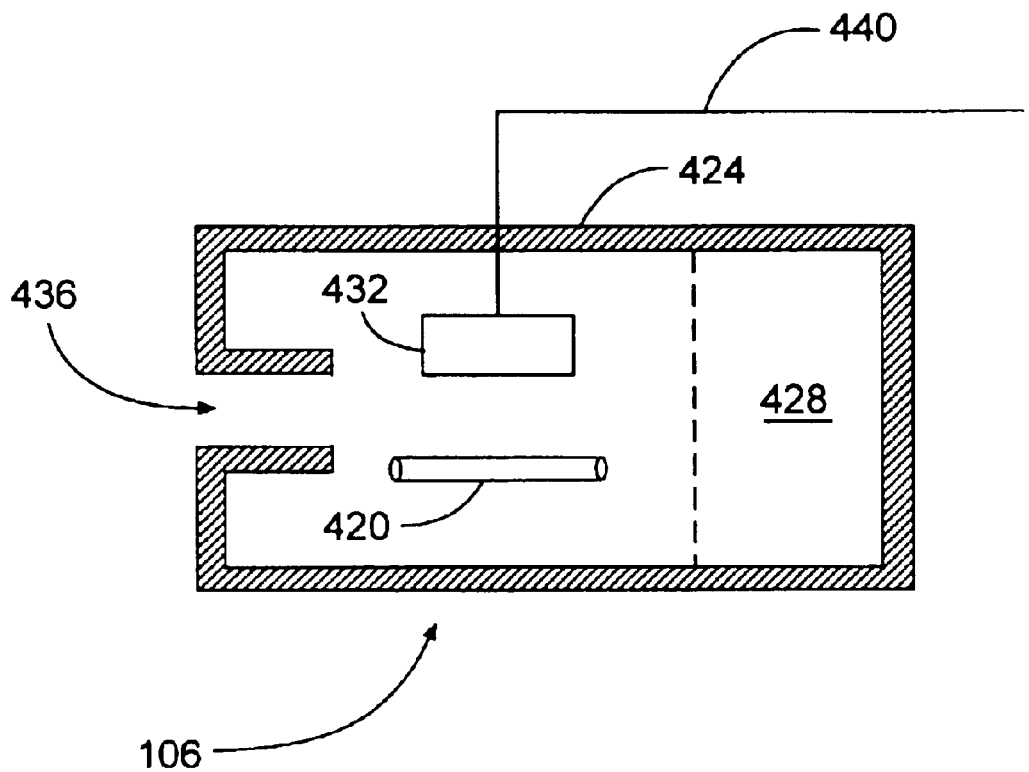

While the system may readily accommodate a number of different types of applications, the operation of the system may be better understood with reference to a particular example, in this case using financial services. Thus, FIG. 4 illustrates a physical configuration that may be used by a self-service device adapted to provide check-cashing functions to customers. Such check-cashing functions correspond to the services offered by the system at block 256 of FIG. 2A. In this exemplary illustration, the verification-instrument module 104 is shown schematically in FIG. 4A and the financial-instrument-module 106 is shown schematically in FIG. 4B. For purposes of this illustration, a new customer wishes to enroll with the system to be permitted to use it for check-cashing purposes, and subsequently wishes to cash a particular check.

Upon first visiting the self-service device, the system takes scans the customer photographically and presents the customer with a menu of valid photographic identification documents that may serve as a verification instrument. Such a menu may include a driver's license, military or state identification, or passport, for example. When the customer makes a selection indicating that he will produce his driver's license, the system responds by requesting the he identify which state issued the driver's license. For purposes of illustration, it is presumed that the customer indicates a state that provides a bar code on the back of the license with a reference number.

The customer is therefore instructed to insert his driver's license into a slot 408 provided in the verification-instrument module 104. The slot 408 is configured within a structure 404 so that the front and back of the card are exposed to optical elements 412, which may be a camera and a bar-code reader, or other suitable optical devices for particular embodiments, and which are connected electrically through connections 416 to other elements of the system. One of the two optical elements 412-1 scans the front of the driver's license to identify the photograph of the customer. Equivalent biometric analyses are performed, such as those described in the '833 patent, on the photographic scan of the customer taken directly and on the scan of the driver's license photograph. The customer is enrolled upon finding them satisfactorily to be of the same individual, one of the two biometric analyses being stored for future reference.

At the same time, the back of the driver's license is scanned with the other of the two optical elements 412-2 to read the bar-code information. Based on the results extracted from the bar code, the appropriate state database is accessed by the central station to extract the customer's personal information. This information is recorded and associated with the stored biometric analysis, substantially reducing the possibility of fraud with the self-service device. In addition, the system may be configured to record an image of the customer's signature extracted from the verification instrument to record as part of the identification information. Such an image may thus be used in certain embodiments for signature comparison in connection with certain services. In one embodiment, the verification-instrument module is configured so that the customer need not insert the verification instrument into the self-service device in a manner that makes it inaccessible. This may be done, for example, by having the slot 408 be large enough for the customer to insert a hand or by configuring the structure 404 to be sufficiently open to permit access with the customer's hand. Such access may be useful where customers may be reluctant to turn over a verification instrument to an automated device.

When the customer returns to the self-service device to cash a check and his identity is confirmed by comparing a new biometric analysis with the stored analysis, he is instructed to insert the check into a slot in the financial-instrument module 106. Housed within the structure 424 of the financial-instrument module 106 is a conveyor 420 adapted to move the check as necessary and a check reader 432 is electrical communication with other parts of the system through connection 440. After the check has been inserted through the slot 436, the check reader scans the check using both magnetic-ink and optical character recognition. Designated zones on the front of the check are examined to validate the magnetic-ink code on the check and to recognize the name of the payee and the amount of the check optically.

Automatic recognition of the payee demonstrates certain advantages of the embodiments of the invention since the payee name may be compared with the name of the customer that was extracted from the verification instrument. The system may thus be configured to limit approval to cashing a particular check to circumstances where the extracted payee name matches the verification-instrument name. The system according to these embodiments thus has the advantage that the customer never actively enters a name himself but is limited to independent extraction of that name by the system. Moreover, this extraction is a simple and efficient process for customers because it is performed automatically by the system without the need for a human to check the identification and perform the enrollment approval. Although this example has focused on use of the self-service device for cashing a check it is apparent that it may be used for any type of financial instrument, including without limitation, a note, a draft, bearer paper, and a promissory note.

In some embodiments, the financial-instrument module 106 may be adapted to examine the back of the check as well as the front of the check, such as by configuring it similarly to the verification-instrument module 104 shown in FIG. 4A. Accordingly, the customer may be instructed to endorse the check before submitting it through slot 436. The system identifies the signature optically and performs pattern recognition on an image of the endorsement signature to compare it with the stored signature image extracted from the verification instrument at the time of enrollment.

Once the system has confirmed the identity of the customer, approval of the check-cashing request may proceed according to preestablished criteria, which may be related to the past history of the customer, his financial information, his credit history, etc. These factors may also influence the size of any transaction fee charged to the customer for providing the service.

Having described several embodiments, it will be recognized by those of skill in the art that various modifications, alternative constructions, and equivalents may be used without departing from the spirit of the invention. For example, embodiments of the invention may be readily adapted for enrollment with self-service devices used in other than financial contexts. Examples may include retail devices and travel check-in devices, among others. Accordingly, the above description should not be taken as limiting the scope of the invention, which is defined in the following claims.

What is claimed is:

1. A method for authorizing a new customer to perform transactions with a self-service device, the method comprising:

extracting a first set of biometric data regarding the customer from a verification instrument;

extracting a second set of biometric data directly from at least one feature of the customer;

extracting textual data regarding the customer from the verification instrument;

automatically comparing the first and second sets of biometric data;

automatically determining, using a trained evaluation system, whether the first and second sets of biometric data are derived from a single individual; and either:

storing the biometric data and the textual data if the automatic determination is that the first and second sets of biometric data are derived from a single individual, or having a human compare underlying sources for the first and second sets of biometric data if the automatic determination is that the first and second sets of biometric data are not from a single individual and thereafter:

determining that the first and second sets of biometric data are derived from the same individual despite differences in the first and second sets of biometric data, inputting feedback information regarding said biometric data differences into the trained evaluation system to cause the evaluation system to reorganize itself to make a determination that the first and second sets of biometric data are from a single individual despite said biometric data differences; and recording the biometric data and textual data in a storage device for retrieval during a future transaction with the same customer.

2. The method recited in claim 1 wherein the customer identification information comprises information derived from the extracted textual data.

3. The method recited in claim 1 wherein the customer identification information comprises a name of the customer.

4. The method recited in claim 3 wherein the transactions comprise providing funds in exchange for a financial instrument identifying the name of the customer.

5. The method recited in claim 4 wherein the financial instrument is selected from the group consisting of a note, a draft, a check, and a promissory note.

6. The method recited in claim 1 wherein the transactions comprise a financial transaction.

7. The method recited in claim 1 wherein the transactions comprise a nonfinancial transaction.

8. The method recited in claim 1 wherein the customer identification information comprises a signature of the customer.

9. The method recited in claim 1 wherein the customer identification information is further derived from one of the first and second sets of biometric data.

10. The method recited in claim 1 wherein the first set of biometric data is derived from image data on the verification instrument.

11. The method recited in claim 1 wherein the first set of biometric data is derived from data encoded magnetically on the verification instrument.

12. The method recited in claim 1 wherein the first set of biometric data is derived from data encoded optically on the verification instrument.

13. The method recited in claim 1 wherein the first and second sets of biometric data are derived from facial features.

14. The method recited in claim 1 wherein the first and second sets of biometric data are derived from fingerprints.

15. The method recited in claim 1 wherein the first and second sets of biometric data are derived from voice features.

16. The method recited in claim 1 wherein the textual data are derived from data encoded magnetically on the verification instrument.

17. The method recited in claim 1 wherein the textual data are derived from data encoded optically on the verification instrument.

18. The method recited in claim 1 wherein extracting textual data regarding the customer from the verification instrument comprises:

extracting a database reference number from the verification instrument; and retrieving the textual data regarding the customer from a database with the database reference number.

19. The method recited in claim 18 further comprising prompting the customer to enter data for comparison with the retrieved textual data.

20. The method recited in claim 1 wherein the self-service device comprises a self-service kiosk.

21. The method recited in claim 1 wherein the trained evaluation system comprises a neural network.

22. The method recited in claim 1 wherein each of the first and second sets of biometric data comprise data derived from different physical features of the customer.

23. A method for executing a transaction with a customer, the method comprising:

extracting a first set of biometric data directly from at least one feature of the customer;

automatically comparing the first set of biometric data with a stored set of biometric data using a trained evaluation system, wherein the stored set of biometric data has previously been authenticated by automatic comparison between a set of biometric data extracted from a verification instrument and a second set of biometric data extracted directly from at least one feature of the customer; and thereafter either completing the transaction if it is determined that the first and stored sets of biometric data are derived from the customer or notifying a human operator that the first and stored sets of biometric data are not derived from the customer and having the operator compare underlying sources for the first and second sets of biometric data, the human operator thereafter:

determining that the first and second sets of biometric data are derived from the customer despite differences in the first and second sets of biometric data;

inputting feedback information regarding said biometric data differences into the trained evaluation system to cause the evaluation system to reorganize itself to make a determination in future transactions with the same customer that the first and second sets of biometric data are from a single individual despite said biometric data differences; and completing the transaction.

24. The method recited in claim 23 wherein the transaction comprises a financial transaction.

25. The method recited in claim 24 further comprising:

extracting textual data from a financial instrument presented by the customer as part of the financial transaction; and comparing the textual data with stored textual data, wherein the stored textual data was extracted from the verification instrument.

26. The method recited in claim 25 wherein the textual data comprises a signature of the customer.

27. The method recited in claim 25 wherein the textual data comprises a name of the customer.

28. The method recited in claim 23 wherein the set of biometric data extracted from the verification instrument is derived from image data on the verification instrument.

29. The method recited in claim 23 wherein the set of biometric data extracted from the verification instrument is derived from data encoded magnetically on the verification instrument.

30. The method recited in claim 23 wherein the set of biometric data extracted from the verification instrument is derived from data encoded optically on the verification instrument.

31. The method recited in claim 23 wherein the trained evaluation system comprises a neural network.

32. The method recited in claim 23 wherein each of the first and second sets of biometric data comprise data derived from different physical features of the customer.

33. A self-service transaction system comprising:

a plurality of networked self-service kiosks, at least one of the self-service devices including:
  a first identification device adapted to extract a first set of identification data directly from a customer; and
  a second identification device adapted to extract a second set of identification data and textual data regarding the customer from a verification instrument;

means for automatically comparing the first and second sets of identification data using a trained evaluation system to make an automatic determination of whether the first and second sets of identification data are derived from a single individual;

means for notifying a human operator if the automatic determination is that the first and second sets of identification data are not derived from a single individual, means for the human operator to compare the first and second sets of identification data and to determine whether the first and second sets of identification data are derived from the same individual despite differences therein;

means for the human operator to provide feedback information to the trained evaluation system so thereby causing the trained evaluation system to self-correct itself to make an automatic determination that the first and second set of identification data are derived from a single individual despite said differences; and a storage device in communication with the at least one of the self-service devices for storing customer identification information derived from the textual data.

34. The system recited in claim 33 wherein the means for automatically comparing is local to the at least one of the self-service devices.

35. The system recited in claim 33 wherein the means for automatically comparing is networked with the plurality of self-service devices.

36. The system recited in claim 33 wherein the first and second sets of identification data comprise biometric data.

37. The system recited in claim 33 wherein the first and second sets of identification data comprise image data.

38. The self-service transaction system recited in claim 33 wherein the trained evaluation system comprises a neural network.

39. The self-service transaction system recited in claim 33 wherein each of the first and second sets of identification data comprise data derived from different physical features of the customer.

* * * * *